US012145299B2

(12) United States Patent
Heo

(10) Patent No.: US 12,145,299 B2
(45) Date of Patent: Nov. 19, 2024

(54) MANUFACTURING METHOD OF THE REFLECTOR

(71) Applicant: ALTO., LTD, Seoul (KR)

(72) Inventor: Yun Soo Heo, Seoul (KR)

(73) Assignee: ALTO., LTD, Seoul (KR)

( * ) Notice: Subject to any disclaimer, the term of this patent is extended or adjusted under 35 U.S.C. 154(b) by 218 days.

(21) Appl. No.: 17/493,077

(22) Filed: Oct. 4, 2021

(65) Prior Publication Data

US 2022/0234268 A1  Jul. 28, 2022

(30) Foreign Application Priority Data

Jan. 28, 2021  (KR) .................. 10-2021-0012308

(51) Int. Cl.
| | | |
|---|---|---|
| *B29C 45/26* | (2006.01) | |
| *B08B 3/12* | (2006.01) | |
| *B29C 45/14* | (2006.01) | |
| *B29C 45/24* | (2006.01) | |
| *B29K 55/02* | (2006.01) | |
| *B29K 69/00* | (2006.01) | |
| *B29L 11/00* | (2006.01) | |

(52) U.S. Cl.
CPC .............. *B29C 45/26* (2013.01); *B08B 3/12* (2013.01); *B29C 45/24* (2013.01); *B29C 2045/14868* (2013.01); *B29K 2055/02* (2013.01); *B29K 2069/00* (2013.01); *B29L 2011/0083* (2013.01)

(58) Field of Classification Search
CPC .......... F21K 9/68; B29C 45/26; B29C 45/24; B08B 3/12; B29K 2055/02
See application file for complete search history.

(56) References Cited

U.S. PATENT DOCUMENTS

| | | | | |
|---|---|---|---|---|
| 2013/0316144 A1* | 11/2013 | Kikuchi | ............. | B29D 11/0073 428/161 |
| 2017/0252953 A1* | 9/2017 | Hibino | ................ | B29C 45/0053 |
| 2019/0063711 A1* | 2/2019 | Tsai | ...................... | F21S 41/285 |

FOREIGN PATENT DOCUMENTS

| | | | | | |
|---|---|---|---|---|---|
| EP | | 2840305 A1 | * | 2/2015 | ........... C23C 14/022 |
| KR | 10-2006-0053757 A | | | 5/2006 | |
| KR | 10-2013-0060564 A | | | 6/2013 | |
| KR | | 101343852 | * | 10/2013 | |

OTHER PUBLICATIONS

William A. Maryniak, Toshio Uehara, Maciej A. Noras, Advanced energy (Year: 2013).*

* cited by examiner

*Primary Examiner* — Emmanuel S Luk
*Assistant Examiner* — Debjani Roy
(74) *Attorney, Agent, or Firm* — Sughrue Mion, PLLC

(57) ABSTRACT

Provided is a manufacturing method of a reflector which is capable of optimally controlling light distribution and suppressing attachment of foreign substances on a surface from which light is reflected, due to the static electricity, and includes (a) injecting a plastic injection product through a mold having an inner surface which is subject to a lapping process; (b) cleaning a surface of the plastic injection product with an ultrasonic wave to remove foreign substances; (c) performing a plasma surface treatment to improve adhesiveness of the plastic injection product cleaned with the ultrasonic wave; (d) depositing an aluminum thin film above the plastic injection product; and (e) performing top coating which is formed as an antistatic layer, on the plastic injection product on which the aluminum thin film is deposited.

10 Claims, 6 Drawing Sheets

[FIG. 1]
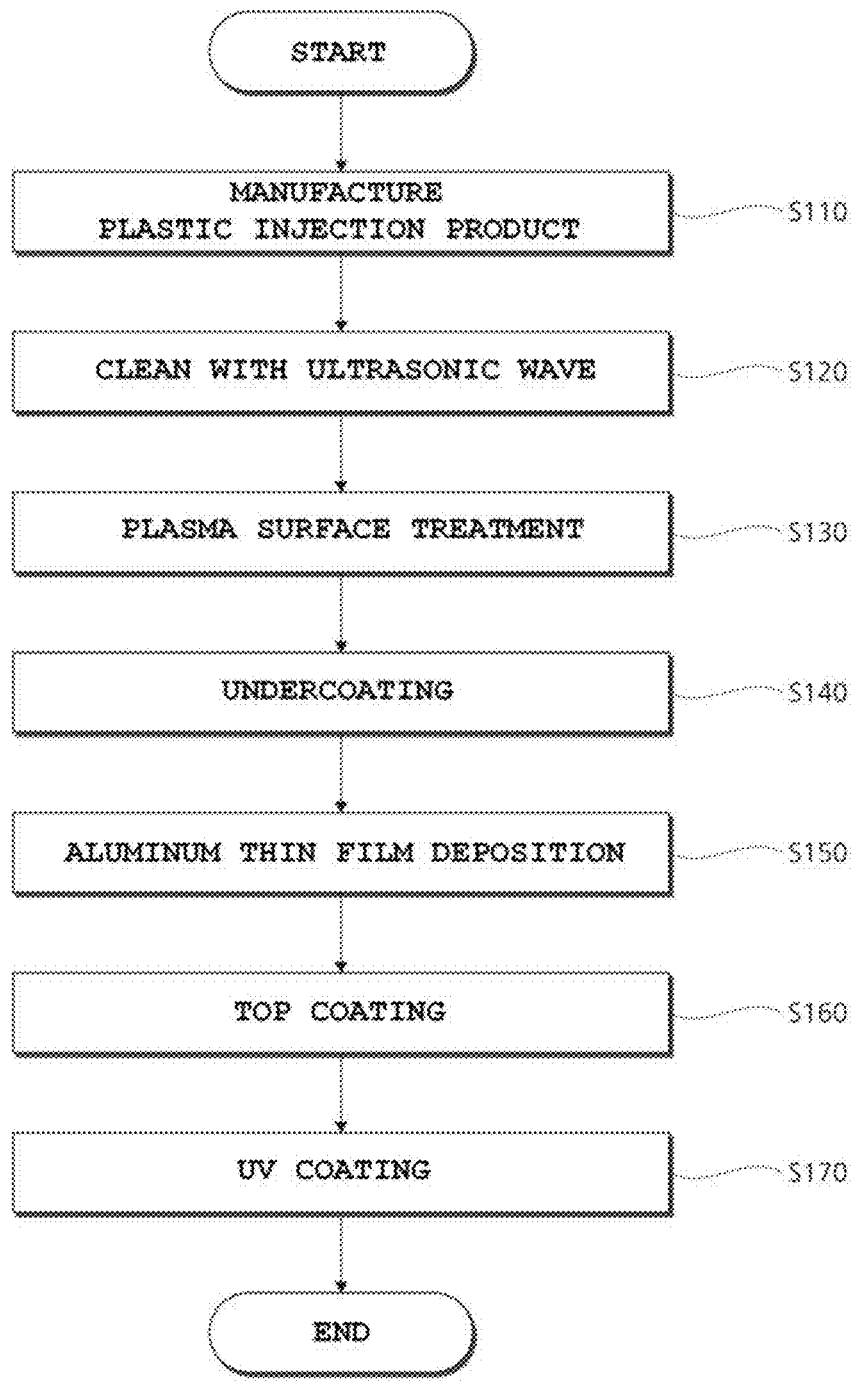

[FIG. 2]
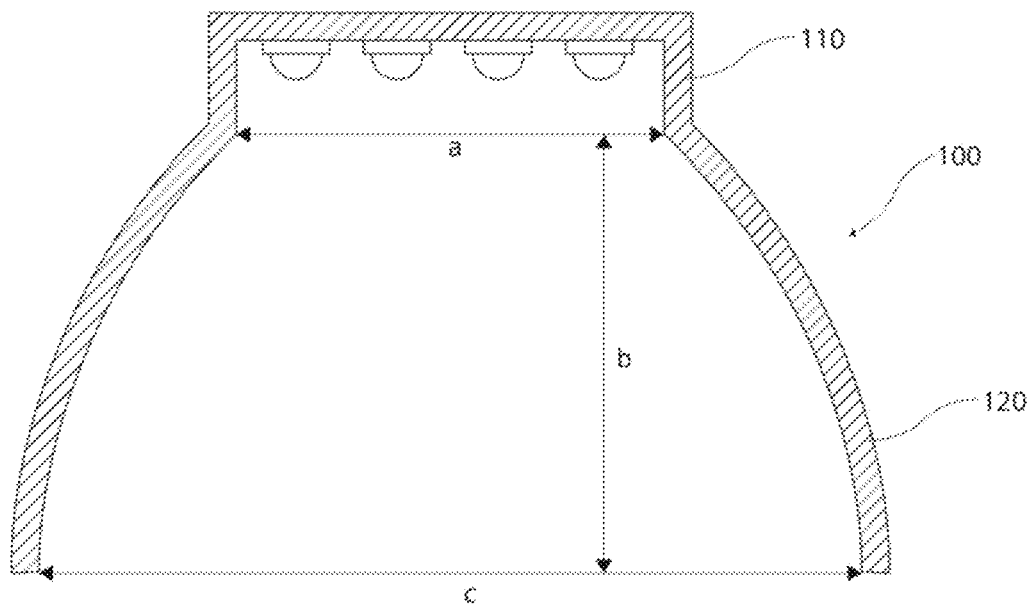
[FIG. 3]
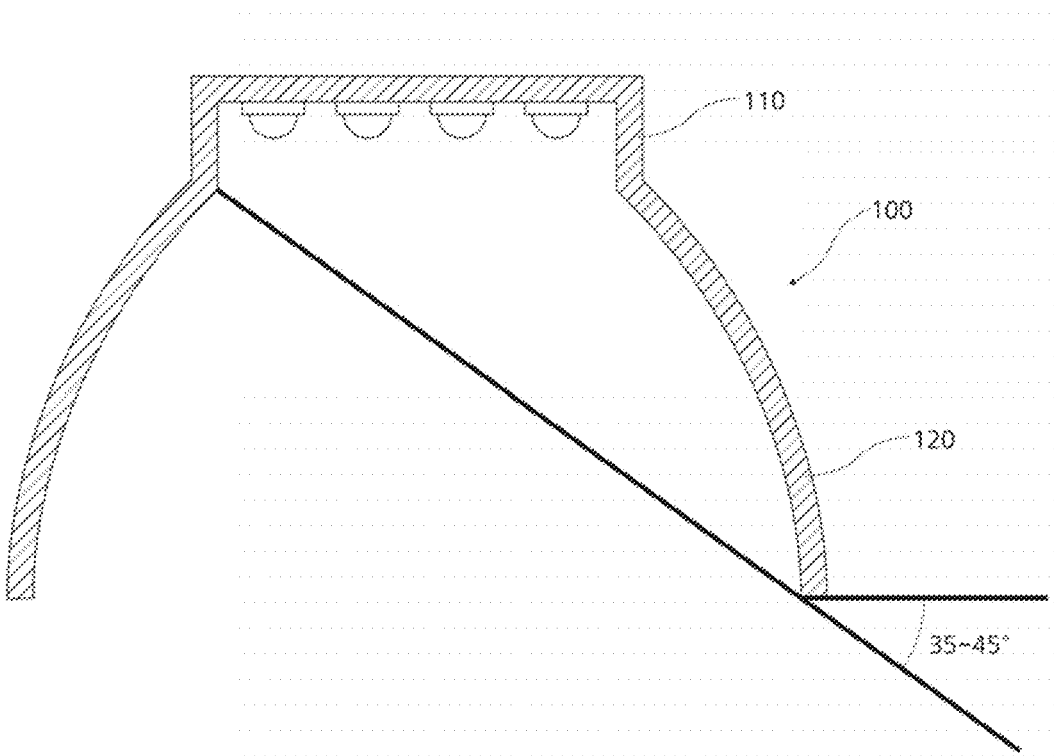

[FIG. 4]
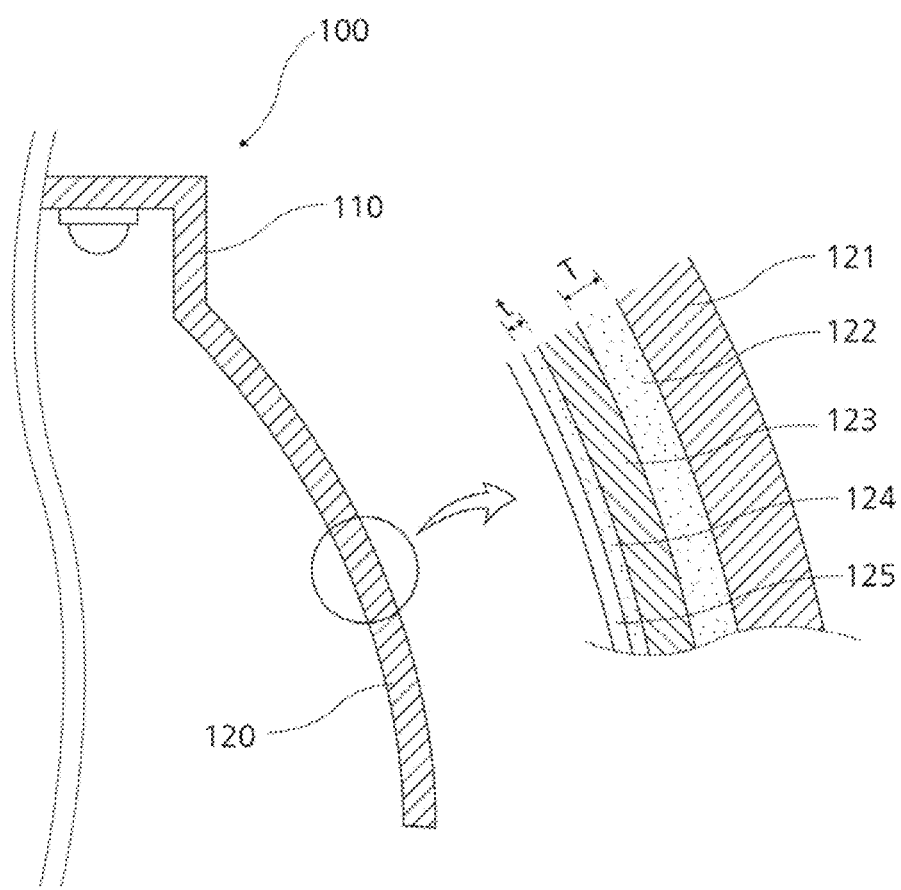

FIG. 5
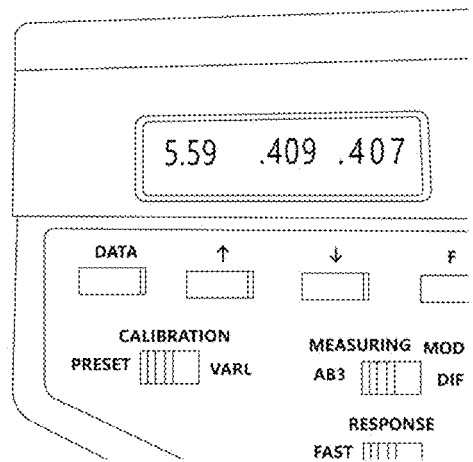
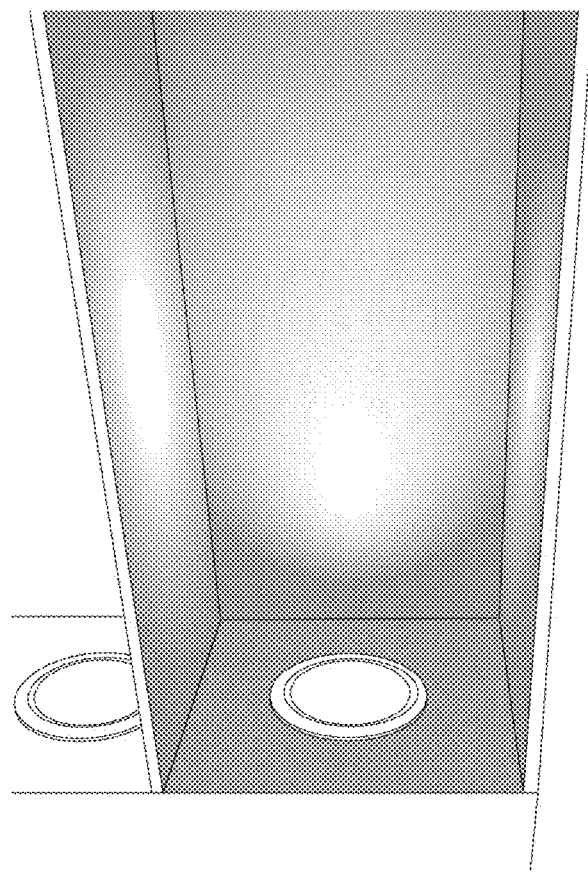

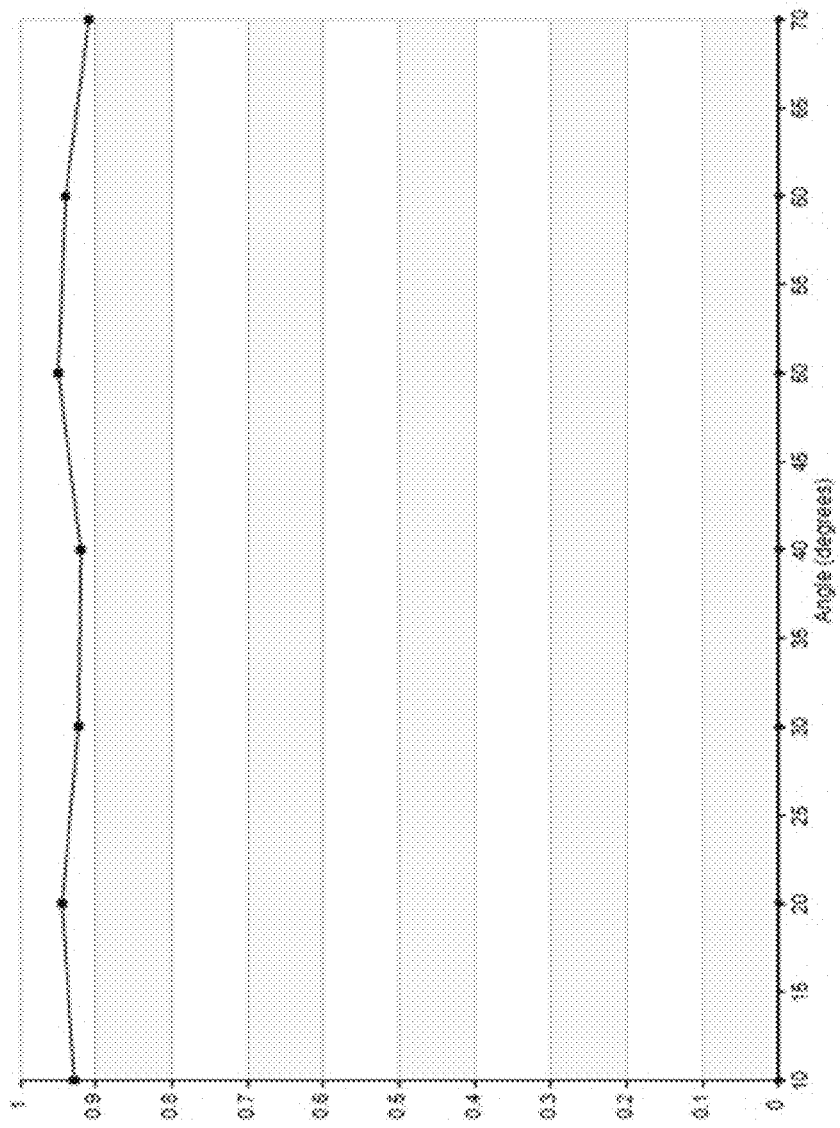
[FIG. 7]

MANUFACTURING METHOD OF THE REFLECTOR

CROSS-REFERENCE TO RELATED APPLICATIONS

This application claims the priority of Korean Patent Application No. 10-2021-0012308 filed on Jan. 28, 2021, in the Korean Intellectual Property Office, the disclosure of which is incorporated herein by reference.

BACKGROUND

Field

The present disclosure relates to a manufacturing method of a reflector, and more particularly, to a manufacturing method of a reflector which is capable of optimally controlling light distribution and suppressing attachment of foreign substances on a surface from which light is reflected, due to static electricity.

Description of the Related Art

Lighting devices use various types of reflectors (reflecting shades) to efficiently focus light emitted from a light source within an angular range to allow the light to be effectively irradiated onto an object to be illuminated. That is, as a method for improving an efficiency of the light devices, a reflector which is manufactured to have various shapes to irradiate light from the light source in a desired direction is used.

In such a reflector, it is necessary to appropriately control the light distribution to effectively irradiate the light in an illumination area and suppress the glaring due to the light trespass which is leaked from the illumination area.

Further, generally, for the reflector, in order to increase a reflectance, a plated thin film is used on a surface of the reflector. However, when the plated thin film is used, there is a problem in that foreign substances such as dusts are attached on a surface due to the static electricity to degrade the reflectance of the reflector.

RELATED ART DOCUMENT

Patent Document

[Patent Document 1] Korean Unexamined Patent Application Publication No. 10-2006-0053757 (May 22, 2006)

[Patent Document 2] Korean Unexamined Patent Application Publication No. 10-2013-0060564 (Jun. 10, 2013)

SUMMARY

The present disclosure is made to solve the above-described problem of the related art and an object of the present disclosure is to provide a manufacturing method of a reflector which is designed to optimally control the light distribution to suppress the glaring while providing appropriate illumination to an illumination area.

Another object of the present disclosure is to provide a manufacturing method of a reflector which suppresses the degradation of the reflectance due to the foreign substance which is attached onto a plated reflective surface of the reflector due to the static electricity.

Still another object of the present disclosure is to provide a manufacturing method of a reflector which maintains a transparency of a surface of the reflector while suppressing the degradation of the reflectance due to the foreign substances attached due to the static electricity, using an antistatic layer.

In order to achieve the above-described object, according to an aspect of the present disclosure, a manufacturing method of a reflector which reflects and focuses light of a light source in LED illumination equipment includes (a) injecting a plastic injection product through a mold having an inner surface which is subject to a lapping process; (b) cleaning a surface of the plastic injection product with an ultrasonic wave to remove foreign substances; (c) performing a plasma surface treatment to improve adhesiveness of the plastic injection product cleaned with the ultrasonic wave; (d) depositing an aluminum thin film above the plastic injection product; and (e) performing top coating which is formed as an antistatic layer, on the plastic injection product on which the aluminum thin film is deposited.

In the manufacturing method of a reflector according to an exemplary embodiment of the present disclosure, the manufacturing method may further include, after the step (e), (f) performing an ultraviolet (UV) coating on the plastic injection product on which top coating is formed.

Further, in the step (a), in the reflector which is the plastic injection product, the plastic injection product is injected to maintain a cutoff angle, which defines a non-illumination range of a light source as an angular range from a horizontal direction, in the range of 35° to 45°.

Further, the reflector may be formed with a ratio of a height of the reflector with respect to a diameter of the reflector in the range of 0.45 to 0.55.

Further, the step (c) includes: (c1) performing a plasma surface treatment; and (c2) performing undercoating which is formed as an antistatic layer on the plastic injection product which is subject to the plasma surface treatment.

A composition for the undercoating includes 40 to 50 wt. % of a conductive polymer, 5 to 10 wt. % of an organic solvent, 5 to 10 wt. % of a binder resin, and 35 to 50 wt. % of water.

Further, a composition for the top coating includes 10 to 30 wt. % of a conductive polymer, 5 to 10 wt. % of an organic solvent, 5 to 10 wt. % of a binder resin, and 55 to 75 wt. % of water.

The conductive polymer may be a polythiophene based material.

The conductive polymer for the top coating may be PEDOT:PSS[poly(3,4-ethylenedioxythiophene)].

The thickness of the undercoating layer may be formed to be larger than the thickness of the top coating layer.

Further, a surface resistance of the plastic injection product may be $1.0 \times 10^3$ MΩ/sq to $5.0 \times 10^3$ MΩ/sq.

Further, the aluminum deposition in the step (e) may be performed in a chamber having a vacuum pressure of $10^{-4}$ to $10^{-6}$ [torr] and in a temperature range of 1500° C. to 1800° C.

The aluminum deposition may be formed with a thickness of 800 Å to 1200 Å.

Further, the aluminum deposition layer may be grounded on a metal frame to which the reflector is coupled.

Further, the plastic injection product may be formed of polycarbonate or ABS resin (acrylonitrile-butadiene-styrene resin).

According to the manufacturing method of a reflector according to the present disclosure with the configuration as described above, a cutoff angle of the reflector which defines a non-illumination range of a light source as an angular range from the horizontal direction is formed in the range of 35° to 45°. Therefore, the luminance of the reflector is maintained to be 10 nit or lower at any angle while maintaining a center illuminance of the illumination area to a predetermined level or higher to prevent the glaring. Therefore, a comfortable psychological state may be maintained and a stress may be relieved.

Further, according to the present disclosure, the antistatic layer is formed by a coating composition including a conductive polymer to lower the surface resistance of the reflector so that the foreign substances are not attached on the reflective surface, thereby improving the reflectance.

Specifically, according to the present disclosure, the antistatic layer is divided into a top coating layer and an undercoating layer with respect to the aluminum thin film and two coating layers have different configurations so that the transparency of the front layer of the aluminum thin film is maintained while lowering the surface resistance of the reflector, thereby maintaining the reflectance of the aluminum thin film.

Moreover, the aluminum thin film layer is grounded to further reduce the surface resistance of the reflector.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a flowchart illustrating a manufacturing method of a reflector according to an exemplary embodiment of the present disclosure;

FIG. 2 is a side cross-sectional view of a reflector according to an exemplary embodiment of the present disclosure;

FIG. 3 is a view illustrating a cutoff angle of the reflector;

FIG. 4 is a partial enlarged view enlarging a cross-section of a part of the reflector;

FIG. 5 is a photographs showing a device and a process of measuring a luminance of the reflector according to the present disclosure;

FIG. 7 is a graph obtained by measuring a reflectance of the reflector.

DETAILED DESCRIPTION OF THE EMBODIMENT

Figure 6:
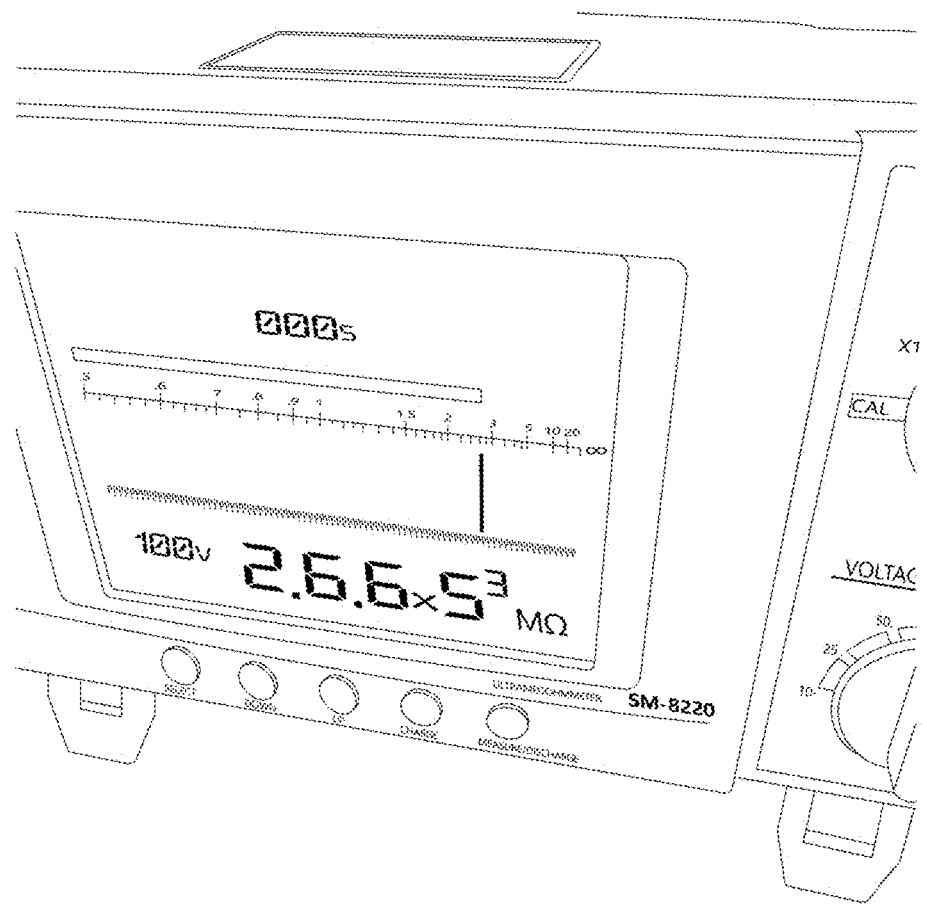
FIG. 6 is a photograph showing a surface resistance measuring device of the reflector.

Those skilled in the art may make various modifications to the present invention and the present invention may have various embodiments thereof, and thus specific embodiments will be illustrated in the drawings and described in detail. However, this does not limit the present invention within specific exemplary embodiments, and it should be understood that the present invention covers all the modifications, equivalents and replacements within the spirit and technical scope of the present invention. In describing the present invention, when it is determined that a detailed description of related well-known technology may obscure the gist of the present invention, the detailed description thereof will be omitted.

Terminologies such as first or second may be used to describe various components but the components are not limited by the above terminologies. The above terms are used only to discriminate one component from the other component.

Terms used in the present application are used only to describe specific exemplary embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination those of described in the specification is present, but do not exclude a possibility of presence or addition of one or more other features, numbers, steps, operations, components, parts or combinations those of, in advance.

The present disclosure relates to a manufacturing method of a reflector which reflects and focuses light of a light source in LED illumination equipment. Hereinafter, the present disclosure will be described in more detail with reference to preferred embodiments and the accompanying drawings.

With regard to this, FIG. 1 is a flowchart illustrating a manufacturing method of a reflector according to an exemplary embodiment of the present disclosure. Referring to FIG. 1, the manufacturing method of the reflector according to the present disclosure may be mainly configured to include a step S110 of injecting a plastic injection product, a step S120 of cleaning a surface of the plastic injection product with an ultrasound wave, a step S130 of subjecting the plastic injection product cleaned with the ultrasound wave to a plasma surface treatment, a step S150 of depositing an aluminum thin film above the plastic injection product, and a step S160 of coating an antistatic layer on the plastic injection product on which the aluminum thin film is deposited.

First, the step S110 of injecting the plastic injection product of the present disclosure is performed by the plastic injection mold.

That is, a hot plastic is injected into a mold with a desired shape at a high pressure and then instantaneously cooled down. Thereafter, the mold is open and the plastic injection product to be used as a reflector is taken out. The plastic which is injected into the mold may be polycarbonate, acrylonitrile butadiene styrene (ABS) resin, or the like.

Here, an inner surface of the mold is subject to a process (a lapping process) of smoothly cutting to be flattened. The mold has a mold inner surface which has undergone the lapping process to make a surface of the plastic injection product injected by the mold smooth. The injection is performed using the mold inner surface which has undergone the lapping process so that there is no need to apply a separate release agent on a surface of the injected plastic injection product. Therefore, the mass productivity of the mold injection and the quality of the aluminum deposition which is a subsequent process may be improved.

In the meantime, FIG. 2 is a side cross-sectional view of a reflector which is a plastic injection product injected by the injection process, FIG. 3 is a view illustrating a cutoff angle of the reflector; and FIG. 4 is a partial enlarged view enlarging a cross-section of a part of the reflector. Referring to FIGS. 2 to 4, the reflector 100 according to the present disclosure may be formed with a semi-circular shape including a light source unit 110 in which an LED light source is installed and a reflection unit 120 from which light irradiated from the light source unit 110 is reflected to be irradiated into an illumination area.

Hereinafter, a specific shape of the reflector 100 which is a plastic injection product which is injected by the step S110 will be described.

The reflector 100 needs to effectively irradiate the light in an illumination area by appropriately controlling the light distribution and suppress the glaring due to the light trespass which is leaked from the illumination area.

The light distribution is determined by the design of a cutoff angle which defines a non-illumination range of the light source by an angular range from a horizontal direction. The cutoff angle may be designed in various ways in accordance with a ratio of a diameter a of the light source unit, a height b of the reflector, and a diameter c of the reflector.

For example, the smaller the radius of curvature of the reflection unit 120 of the reflector, that is, the smaller the height b of the reflector, the larger the light distribution, but the lower the center illuminance. Further, as the height b of the reflector is increased, the radius of curvature of the reflection unit is increased so that the light distribution is reduced and the control of the light distribution is not easy.

Accordingly, it is important to find an optimal height b by adjusting the ratio of a:b:c and design an optimal cutoff angle. Therefore, according to the present disclosure, the cutoff angle of the reflector 100 is maintained in the range of 35° to 45°. At this time, it is desirable that the height b of the reflector 100 is formed in the range of 0.45 to 0.55 with respect to the diameter c of the reflector 100.

By doing this, the reflector according to the present disclosure provides optimal illumination to the illumination area and effectively suppresses the light leaked from the illumination area which is a cause of the glaring to maintain the surface luminance of the reflector to be 10 nit or lower at any angle. The unit [nit] is a brightness of an object seen from a specific direction and corresponds to the unit [cd/m$^2$] and involves the glaring. FIG. 5 is a photographs showing a device and a process of measuring a luminance of the reflector according to the present disclosure.

As described above, after injecting the plastic injection product using the mold having a lapped inner surface, the ultrasonic cleaning process which is a primary cleaning process is performed (S120).

According to the ultrasonic cleaning principle, when a container is filled with water and ultrasonic waves are generated on a bottom thereof, the water vibrates at a high frequency to increase a kinetic energy. When a contaminated object is put in this water, the object is washed by the ultrasonic vibration of the cleaning water.

When the plastic injection product attached with foreign substances is immersed in the liquid and an ultrasonic wave is applied to the liquid, a hydraulic pressure shockingly fluctuates to be eroded on the surface of the plastic injection product to be cleaned. Accordingly, an inner surface of a plastic injection product with a complex shape or a narrow groove may be simply cleaned. The ultrasonic cleaning may easily remove a micro-size foreign substance of 10 micrometers or lower of the plastic injection product.

After the ultrasonic cleaning, a secondary cleaning process is performed. As the secondary cleaning process, a plasma surface treatment is performed (S130).

During the plasma surface treatment, particles having a high energy in a plasma state collides with the surface to remove the foreign substances to allow the surface to well react with the other material in the subsequent process. When the surface of the plastic injection product is treated with a plasma which is a highly activated and ionized gas, the foreign substances on the surface of the plastic injection product may be completely removed.

For example, according to the ion discharge generated in a plasma generating device, impact is applied to the surface of the material of the plastic injection product by high speed discharge of the ion and organism and inorganic contaminants on the surface of the plastic injection product may be removed by the ion impact of the anode. 1 micrometer or lower of foreign substances may be removed by the plasma surface treatment.

An undercoating using a coating composition including a conductive polymer is performed on the surface of the plastic injection product on which the plasma surface treatment is performed to suppress the static state (S140). This will be described below in more detail.

As described above, an aluminum deposition process is performed on a surface of the plastic injection product on which the antistatic layer is formed to form a reflective surface (S150).

During the aluminum deposition process, when aluminum is heated to 1500° C. or higher under a vacuum of $10^{-4}$ to $10^{-6}$ (torr), the aluminum is evaporated so that an aluminum thin film is deposited on the plastic injection product such as PC or ABS with a thickness of 800 Å to 1200 Å.

As described above, on the surface of the plastic injection product on which the aluminum thin film is deposited, a top coating is additionally performed by a coating composition including a conductive polymer to suppress the additional static state (S160).

After performing the top coating as described above, an ultraviolet (UV) coating may be additionally performed (S170).

A coating material used for the UV coating may include an oligomer, a monomer, a photo initiator, additives, and the like, and as the UV coating method, a spray method and a flow coating method may be used. A coating layer 125 is formed on the top coating layer using a coating material which is cured in a short time by irradiating an ultraviolet ray to improve a durability and prevent the contamination.

Hereinafter, the undercoating and the top coating for suppressing the static state of the surface will be described in more detail.

There is a problem in that foreign substances such as dusts are attached on a surface of the above-described aluminum thin film due to the static electricity to degrade the reflectance of the reflector. Therefore, according to the present disclosure, an antistatic layer is formed by a coating composition including a conductive polymer to lower a surface resistance of the reflector so that the foreign substances are not attached on the reflective surface. Therefore, the reflectance is improved.

However, the conductive polymer which is generally used as the antistatic material has a low transparency so that there is a problem in that when the surface is coated to reflect the light source, the reflectance of the reflective surface is degraded.

Therefore, when a lot of antistatic materials are formed on the surface of the aluminum thin film layer to increase the antistatic efficiency, the surface reflectance is degraded. In contrast, in order to maintain a high surface reflectance, when less antistatic materials are formed on the antistatic layer, a sufficient antistatic effect may not be expected.

Accordingly, according to the present disclosure, the antistatic layer is divided into the top coating layer 124 formed on the aluminum thin film 123 and an undercoating layer 122 formed between the surface of the plastic injection product 121 and the aluminum thin film 123. Further, both the coating layers 122 and 124 have different configurations to maintain the transparency of a front layer of the aluminum thin film while lowering the surface resistance of the reflector 100 to maintain the reflectance of the aluminum thin film 123.

To this end, according to the present disclosure, contents of the antistatic polymer materials of the top coating layer and the undercoating layer may be set to be different. According to the present disclosure, a composition for undercoating includes 40 to 50 wt. % of a conductive polymer, 5 to 10 wt. % of an organic solvent, 5 to 10 wt. % of a binder resin, and 35 to 50 wt. % of water. Further, a composition for the top coating may include 10 to 30 wt. % of a conductive polymer, 5 to 10 wt. % of an organic solvent, 5 to 10 wt. % of a binder resin, and 55 to 75 wt. % of water.

That is, since the undercoating is formed below the aluminum thin film and does not affect the reflectance, a function of lowering the surface resistance is primarily important. Therefore, it is desirable to include the conductive polymer more than that in the top coating. In contrast, the top coating is formed above the aluminum thin film so that in order to less affect the reflectance, it is desirable to include less conductive polymer.

In the meantime, according to the present disclosure, the types of the antistatic polymer materials of the top coating layer and the undercoating layer may be differently set. That is, the conductive polymer may use a polythiophene based material and specifically, the conductive polymer for top coating may use PEDOT:PSS[poly(3,4-ethylenedioxythiophene)]having excellent transparency.

According to the experiment, when the conductive transparent film is produced to have a thickness of 1 mm, a transparency of a transparent film which uses PEDOT:PSS [poly(3,4-ethylenedioxythiophene)] as a conductive polymer is improved by 30% or more as compared with the transparent film using a general conductive polymer.

Further, according to the present disclosure, the top coating layer and the undercoating layer may have different thicknesses. That is, the undercoating layer does not affect the reflectance of the reflector so that it is desirable that the thickness of the undercoating layer is formed to be larger than the thickness of the top coating layer to further reduce the surface resistance.

The surface resistance of the reflector according to the present disclosure which includes the antistatic layer according to the above-described method may be formed in the range of $1.0 \times 10^3$ MΩ/sq to $5.0 \times 10^3$ MΩ/sq. FIG. 6 is a photograph showing a surface resistance measuring device of the reflector. Together with this, as illustrated in FIG. 7, it may be understood that the reflectance of the reflector is maintained to be 90% or more in the visible ray region.

In the meantime, the static electricity which spreads by the antistatic layer is discharged by the ground to increase the antistatic effect. Therefore, according to the present disclosure, the aluminum thin film layer is grounded onto a metal frame to which the reflector is coupled to further reduce the surface resistance of the reflector.

That is, the aluminum thin film layer 123 is a conductor thin film which are in contact with both the top coating layer 124 and the undercoating layer 122 so that the aluminum thin film layer 123 is grounded on the metal frame to achieve the effect that both the top coating layer 124 and the undercoating layer 122 are grounded.

As described above, the preferred embodiment of the present invention has been described, but it should be understood that those skilled in the art may modify and change the present invention in various ways without departing from the spirit of the present invention described in the claims by the addition, change, deletion or addition of constituent elements, and that the modifications and changes are included in the scope of the present invention.

For example, each component which is described as a singular form may be divided to be implemented and similarly, components which are described as a divided form may be combined to be implemented. The scope of the present invention is represented by the claims to be described below rather than the detailed description, and it is to be interpreted that the meaning and scope of the claims and all the changes or modified forms derived from the equivalents thereof come within the scope of the present disclosure.

The present disclosure relates to a manufacturing method of a reflector which is capable of optimally controlling the light distribution and suppressing the attachment of the foreign substances on a surface from which light is reflected, due to the static electricity. According to the present disclosure, the transparency of the front layer of the aluminum thin film is maintained while lowering the surface resistance of the reflector to maintain a high reflectance of the reflective surface.

What is claimed is:

1. A manufacturing method of a reflector which reflects and focuses light of a light source in LED illumination equipment, the manufacturing method comprising:
   (a) injecting a plastic injection product through a mold having an inner surface which is subject to a lapping process;
   (b) cleaning a surface of the plastic injection product with an ultrasonic wave to remove foreign substances;
   (c) performing a plasma surface treatment to improve adhesiveness of the plastic injection product cleaned with the ultrasonic wave, the step (c) comprising
      (c1) performing a plasma surface treatment; and
      (c2) performing undercoating which is formed as an antistatic layer on the plastic injection product which is subject to the plasma surface treatment;
   (d) depositing an aluminum thin film above the plastic injection product; and
   (e) performing top coating which is formed as an antistatic layer, on the plastic injection product on which the aluminum thin film is deposited,
   wherein a thickness of a undercoating layer is larger than a thickness of a top coating layer, and
   wherein a composition for the undercoating includes 40 wt. % to 50 wt. % of a conductive polymer, 5 wt. % to 10 wt. % of an organic solvent, 5 wt. % to 10 wt. % of a binder resin, and 35 wt. % to 50 wt. % of water and a composition for the top coating includes 10 wt. % to 30 wt. % of a conductive polymer, 5 wt. % to 10 wt. % of an organic solvent, 5 wt. % to 10 wt. % of a binder resin, and 55 wt. % to 75 wt. % of water.

2. The manufacturing method of a reflector according to claim 1, further comprising:
   after the step (e),
   (f) performing an ultraviolet (UV) coating on the plastic injection product on which the top coating is formed.

3. The manufacturing method of a reflector according to claim 1, wherein the step (a), in the reflector which is the plastic injection product, the plastic injection product is injected to maintain a cutoff angle, which defines a non-illumination range of a light source as an angular range from a horizontal direction, in the range of 35° to 45°.

4. The manufacturing method of a reflector according to claim 1, wherein the conductive polymer of the composition for the undercoating and the composition for the top coating is a polythiophene based material.

5. The manufacturing method of a reflector according to claim 1, wherein a surface resistance of the plastic injection product is $1.0 \times 10^3$ MΩ/sq to $5.0 \times 10^3$ MΩ/sq.

6. The manufacturing method of a reflector according to claim 1, wherein the plastic injection product is formed by polycarbonate or ABS resin (acrylonitrile-butadiene-styrene resin).

7. The manufacturing method of a reflector according to claim 3, wherein the reflector is formed with a ratio of a height of the reflector with respect to a diameter of the reflector in the range of 0.45 to 0.55.

8. The manufacturing method of a reflector according to claim 4, wherein the conductive polymer for the top coating is PEDOT:PSS[poly(3,4-ethylenedioxythiophene)].

9. The manufacturing method of a reflector according to claim 1, wherein the aluminum deposition in the step (e) is performed in a chamber having a vacuum pressure of $10^{-4}$ to $10^{-6}$ [torr] and in a temperature range of 1500° C. to 1800° C.

10. The manufacturing method of a reflector according to claim 9, wherein the aluminum deposition is formed with a thickness of 800 Å to 1200 Å.

* * * * *